United States Patent
Pehlert et al.

(10) Patent No.: US 10,538,645 B2
(45) Date of Patent: *Jan. 21, 2020

(54) POLYPROPYLENES HAVING BALANCED STRAIN HARDENING, MELT STRENGTH, AND SHEAR THINNING

(71) Applicant: ExxonMobil Chemical Patents Inc., Baytown, TX (US)

(72) Inventors: George J. Pehlert, Houston, TX (US); Mosha H. Zhao, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/541,609

(22) PCT Filed: Jan. 21, 2016

(86) PCT No.: PCT/US2016/014237
§ 371 (c)(1),
(2) Date: Jul. 5, 2017

(87) PCT Pub. No.: WO2016/126429
PCT Pub. Date: Aug. 11, 2016

(65) Prior Publication Data
US 2018/0016414 A1    Jan. 18, 2018

Related U.S. Application Data

(60) Provisional application No. 62/111,802, filed on Feb. 4, 2015.

(51) Int. Cl.
| C08K 5/14 | (2006.01) |
| C08F 110/06 | (2006.01) |
| C08G 83/00 | (2006.01) |
| C08J 9/00 | (2006.01) |

(52) U.S. Cl.
CPC .............. C08K 5/14 (2013.01); C08F 110/06 (2013.01); C08G 83/005 (2013.01); C08J 9/00 (2013.01); C08J 2201/026 (2013.01); C08J 2205/052 (2013.01); C08J 2323/26 (2013.01)

(58) Field of Classification Search
CPC ...... C08K 5/14; C08F 110/06; C08F 2810/10; C08G 83/005
See application file for complete search history.

(56) References Cited

U.S. PATENT DOCUMENTS

| 4,897,452 A | 1/1990 | Berrier et al. |
| 5,047,485 A | 9/1991 | DeNicola, Jr. |
| 5,180,751 A | 1/1993 | Park et al. |
| 5,416,169 A | 5/1995 | Saito et al. |
| 5,883,151 A | 3/1999 | Raetzsch et al. |
| 6,103,833 A | 8/2000 | Hogt et al. |
| 6,323,289 B1 | 11/2001 | Hogt et al. |
| 6,350,828 B1 | 2/2002 | Takaoka et al. |
| 6,573,343 B1 | 6/2003 | Follestad |
| 6,875,826 B1 | 4/2005 | Huovinen et al. |
| 6,956,067 B2 | 10/2005 | Sasaki et al. |
| 8,153,745 B2 | 4/2012 | Ernst et al. |
| 9,068,030 B2 | 6/2015 | Song et al. |
| 9,200,095 B2 | 12/2015 | Tran et al. |
| 9,464,178 B2 | 10/2016 | Abubakar et al. |
| 9,902,822 B2 | 2/2018 | Abubakar et al. |
| 2002/0043643 A1 | 4/2002 | Korehisa et al. |
| 2003/0119996 A1 | 6/2003 | Kitano et al. |
| 2003/0157286 A1 | 8/2003 | Hesse et al. |
| 2009/0264567 A1 | 10/2009 | Prins et al. |
| 2010/0222470 A1 | 9/2010 | Basfar et al. |
| 2012/0245302 A1 | 9/2012 | Nakajima et al. |
| 2013/0032963 A1 | 2/2013 | Tokiwa et al. |
| 2015/0018463 A1 | 1/2015 | Chikhalikar et al. |
| 2015/0274907 A1* | 10/2015 | MacDonald ............ C08L 23/12 428/523 |
| 2015/0284521 A1 | 10/2015 | Abubakar et al. |
| 2015/0291755 A1 | 10/2015 | Abubakar et al. |
| 2017/0066894 A1 | 3/2017 | Williams et al. |

FOREIGN PATENT DOCUMENTS

| EP | 2000504 A | 12/2008 | |
| EP | 1159309 B | 2/2009 | |
| EP | 2433982 A | 3/2012 | |
| EP | 2433982 A1 * | 3/2012 | ............ C08K 5/526 |
| EP | 2679630 A | 1/2014 | |
| JP | 2010-043162 A | 2/2010 | |
| JP | 2010043162 A | 2/2010 | |
| KR | 20040085637 A | 10/2004 | |
| WO | 94/05707 A | 3/1994 | |
| WO | 1997/49759 A | 12/1997 | |
| WO | 99/27007 A | 6/1999 | |

(Continued)

OTHER PUBLICATIONS

Bacci, D. et al. "Peroxide Crosslinking of Ziegler-Natta Thermoplastic Polyolefins", Polymer Engineering and Science, vol. 44, No. 1, pp. 131-140, 2004.
Maier, C., et al., "Polypropylene—The Definitive User's Guide and Databook" William Andrew Publishing/Plastics Design Library, Norwich NY, pp. 27-29, 1998.
Pol, H. et al. "Microstructure and Rheology of High-Melt-Strength poly-(propylene) Impact Copolymer", Society of Plastics Engineers Plastics Research Online, 2014.
Wagner, M.H, "The strain-hardening behaviour of linear and long-chain-branched polyolefin melts in extensional flows", Rheol Act, vol. 39, pp. 97-109, 2000.

(Continued)

Primary Examiner — Kara B Boyle
(74) Attorney, Agent, or Firm — Kevin M. Faulkner (57) ABSTRACT

A composition comprising the reaction product of a polypropylene comprising at least 50 mol % propylene, and having a molecular weight distribution (Mw/Mn) greater than 6, a branching index ($g'_{vis}$) of at least 0.97, and a melt strength greater than 10 cN determined using an extensional rheometer at 190° C.; and within the range from 0.01 to 3 wt % of at least one organic peroxide, by weight of the polypropylene and organic peroxide. Such hyperbranched polypropylenes are useful in films, foamed articles, and thermoformed articles.

17 Claims, 7 Drawing Sheets

(56) References Cited

FOREIGN PATENT DOCUMENTS

| WO | 2012/049690 A | 4/2012 |
|---|---|---|
| WO | 2012/173873 A | 12/2012 |
| WO | 2013/032552 A | 3/2013 |
| WO | 2014/070384 A | 5/2014 |
| WO | 2014/070386 A | 5/2014 |
| WO | 2015/200586 A | 12/2015 |
| WO | 2016/126430 A | 8/2016 |
| WO | 2016/164111 A | 10/2016 |

OTHER PUBLICATIONS

Lagendijk, R.P., "Peroxydicarbonate modification of polypropylene and extensional flow properties", Polymer, vol. 42, pp. 10035-10043, 2001.
Spitael, P., "Strain Hardening in polypropylenes and its role in extrusion foaming", Polymer Engineering and Science, vol. 44, No. 11, pp. 2090-2100, 2004.
Ratzsch, M. "Radical reactions on polypropylene in the solid state" Progress in Polymer Science, vol. 27, pp. 1195-1282, 2002.
Spisakova, N. "Partial crosslinking of the heterophasic ethylene-propylene copolymer in the solid phase", Journal of Macromolecular Science Part A, vol. 37, pp. 15-35, 2000.
Jayaraman, K. et al. "Entangling additives enhance polypropylene foam quality" Society of Plastics Engineers Plastics Research Online, 2011.
Gotsis, A.D., "Effect of long branches on the rheology of polypropylene" Journal of Rheology, vol. 48, No. 4, pp. 895-914, 2004.
"Polymer Properties Database" (URL:http://polymerdatabase.com/polymer%20chemistry/t-half2.html).
Iacobucci, P., "High Melt Strength polypropylene through reactive extrusion with Perkadox 24L" SPE Polyolefins Conference, Houston, Texas, pp. 1-32, Feb. 2014.

* cited by examiner

POLYPROPYLENES HAVING BALANCED STRAIN HARDENING, MELT STRENGTH, AND SHEAR THINNING

CROSS-REFERENCE TO RELATED APPLICATIONS

This application is a National Phase Application claiming priority to PCT Application Serial No. PCT/US2016/014237 filed Jan. 21, 2016, and claims the benefit of priority from U.S. Provisional Application No. 62/111,802, filed Feb. 4, 2015, the disclosures of which are incorporated herein by reference.

FIELD OF THE INVENTION

The present disclosure relates to polypropylene, and in particular, to polypropylene having a balanced melt strength and strain hardened, making it suitable for foamed articles.

BACKGROUND

The production of closed-cell foams with linear polypropylene ("PP") is difficult because the PP melt does not exhibit strain hardening under extensional flow. The lack of strain hardening leads to thinner cell walls during bubble expansion in the foaming process, coalescence of bubbles, and the formation of open-cell foams. Previous efforts to modify linear PP by introduction of long chain branching through reactive extrusion with organic peroxides such as peroxydicarbonates resulted in increased strain hardening, but the level of strain hardening alone was not sufficient to produce closed-cell foams. And further, it has been found that strain hardening alone is not sufficient, that sufficient melt strength as well as shear thinning is also necessary to achieve a desirable foam using PP. What is needed is a polypropylene that has sufficient melt strength and strain hardening to form commercially viable foamed articles.

Relevant publications include M. H. Wagner et al., "The strain-hardening behaviour of linear and long-chain-branched polyolefin melts in extensional flows," in 39 RHEOL. ACTA 97-109 (2000); R. P. Lagendijk et al., in "Peroxydicarbonate modification of polypropylene and extensional flow properties," in 42 POLYMER 10035-10043 (2001); P. Spitael et al., in "Strain hardening in polypropylenes and its role in extrusion foaming," in 44(11) POLY. ENG. & SCI. 2090-2100 (2004); K. Jayaraman et al., "Entangling additives enhance polypropylene foam quality," in SPE PLASTICS RESEARCH ONLINE (2011); P. Iacobucci, "High melt strength polypropylene through reactive extrusion with Perkadox 24L," SPE POLYOLEFINS CONFERENCE, Houston, Tex. (February 2004); H. Pol et al., "Microstructure and rheology of high-melt-strength poly-(propylene) impact copolymer," in SPE PLASTICS RESEARCH ONLINE (2014); M. Ratzsch et al., 27 PROG. POLYM. SCI. 27 1195 (2002); and N. Spisakova et al., in 15 J. MACRM. SCI. & APP. CHEM. 37 (2000); EP 2679630 A1; EP 2000504 A1; U.S. Pat. Nos. 5,047,485; 5,416,169; 5,883,151; 6,956,067; 6,875,826 A1; U.S. Pat. Nos. 6,573,343; 6,350,828; 6,323,289; 8,153,745; 9,068,030; 9,200,095; US 2002/0043643; US 2003/0157286 A1; US 2012/245302; WO 1994/005707 A1; and WO 2014/070386.

SUMMARY

Disclosed herein is a composition comprising the reaction product of a polypropylene comprising at least 50 mol % propylene, and having a molecular weight distribution (Mw/Mn) greater than 6, a branching index ($g'_{vis}$) of at least 0.97, and a melt strength greater than 10 cN determined using an extensional rheometer at 190° C.; and within the range from 0.01 to 3 wt % of at least one organic peroxide, by weight of the polypropylene and organic peroxide.

Also disclosed is a process to form a composition comprising combining a polypropylene comprising at least 50 mol % propylene, and having a molecular weight distribution (Mw/Mn) greater than 6, a branching index ($g'_{vis}$) of at least 0.97, and a melt strength greater than 10 cN determined using an extensional rheometer at 190° C.; and within the range from 0.01 to 3 wt % of at least one organic peroxide, by weight of the polypropylene and organic peroxide.

DETAILED DESCRIPTION

Disclosed herein is a broad molecular weight polypropylene with a high molecular weight fraction (i.e. high molecular weight tail) modified by introduction of long chain branching through reactive extrusion with an organic peroxide. The result is a hyperbranched polypropylene with a pronounced increase in shear thinning, melt strength and strain hardening. The resulting hyperbranched polypropylene has sufficient strain hardening to produce closed-cell foam and is useful in applications requiring increased shear thinning, balanced melt strength and strain hardening including but not limited to foaming, blown film, thermoforming and extrusion profiles.

As used herein, "shear thinning" describes non-Newtonian fluids which have decreased viscosity when subjected to shear strain; thus, polymers that exhibit "shear thinning" have improved processability in that when exposed to extruder conditions of shear stress, the polymers are more easily processed. A MCR501 Dynamic Stress/Strain Rheometer was used to measure shear thinning of the polypropylene samples.

As used herein, "strain hardening" or cold working, is the strengthening of a polymer when exposed to forces of deformation. "Strain hardening" manifests as the increase in stress that is required to cause an increase in strain as a polymer is plastically deformed. A TA Instruments ARES-G2 mechanical spectrometer was used to measure strain hardening of the polypropylene samples.

As used herein, "melt strength" refers to the resistance of a polymer melt to stretching. The melt strength of a material is related to the molecular chain entanglements of the polymer and its resistance to untangling under strain. The polymer properties affecting the resistance to untangling are molecular weight, molecular-weight distribution (MWD) and molecular branching. It is determined herein determined using an extensional rheometer at 190° C.

These ends are accomplished at least in part with a polypropylene comprising (or consisting essentially of, or consisting of) the reaction product of a polypropylene comprising at least 50 mol % propylene, and having a molecular weight distribution (Mw/Mn) greater than 6, or 8, or 10, a branching index ($g'_{vis}$) of at least 0.97, and a melt strength greater than 10, or 20, or 30 cN determined using an extensional rheometer at 190° C.; and within the range from 0.01 to 1, or 2, or 3 wt % of at least one organic peroxide, by weight of the polypropylene and organic peroxide. The "reaction product" will preferably comprise a cross-linked polypropylene, a long-chain branched polypropylene, or a combination of the two, and most preferably also include side products such as carbon dioxide and alcohol, especially a C6 to C30 alcohol such as cetyl alcohol.

Thus, stated another way, in any embodiment the hyperbranched polypropylene is a polypropylene having a melt strength within the range from 40, or 45 cN to 60, or 65, or 80, or 100 cN, and a branching index ($g'_{vis}$) of less than 0.97, or 0.95, and preferably other features as described herein. Most preferably the hyperbranched polypropylene comprises cross-linked polypropylene, a long-chain branched polypropylene, or a combination thereof, carbon dioxide, and a C6 to C30 alcohol such as cetyl alcohol. The alcohol is typically present, if at all, at a level of less than 2, or 1, or 0.5 wt % by weight of the hyperbranched polypropylene.

In any embodiment the hyperbranched polypropylene has a number average molecular weight (Mn), by DRI analysis, within a range from 18,000, or 20,000, or 24,000, or 28,000 g/mole to 40,000, or 44,000, or 48,000, or 50,000 g/mole. Also in any embodiment the hyperbranched polypropylene has a weight average molecular weight ($Mw_{MALLS}$), by MALLS analysis within the range from 250,000, or 300,000 or 350,000 g/mole to 450,000, or 500,000, or 550,000 or 600,000 g/mole. Also in any embodiment the hyperbranched polypropylene has a z-average molecular weight ($Mz_{MALLS}$), by MALLS analysis within the range from 1,000,000, or 1,100,000, or 1,200,000 g/mole to 1,500,000, or 1,600,000, or 1,700,000, or 1,800,000 g/mole.

As used throughout the specification, "MALLS" analysis, which is described further in the "Examples", may be used to measure the molecular weight properties of the polypropylenes described herein, but if not otherwise indicated, DRI analysis is used for molecular weight determinations.

As an indicator of its high molecular weight component or "tail", the hyperbranched polypropylene has in any embodiment an $Mz_{MALLS}/Mw_{MALLS}$ value of greater than 3.0, or 3.2, or 3.6, or within a range from 3.0 or 3.2, or 3.6 to 4.0 or 4.5 or 5.0 or 6.0. Also, the hyperbranched polypropylene has a $Mz_{MALLS}/Mn$ of greater than 30 or 35 or 40, or within a range from 30, or 35, or 40 to 44, or 48, or 50, or 55, or 60. Also, the hyperbranched polypropylene has in any embodiment a $Mw_{MALLS}/Mn$ ($MWD_{MALLS}$) of greater than 10, or 12, or within a range from 10, or 12 to 18, or 20.

Figure 7A:
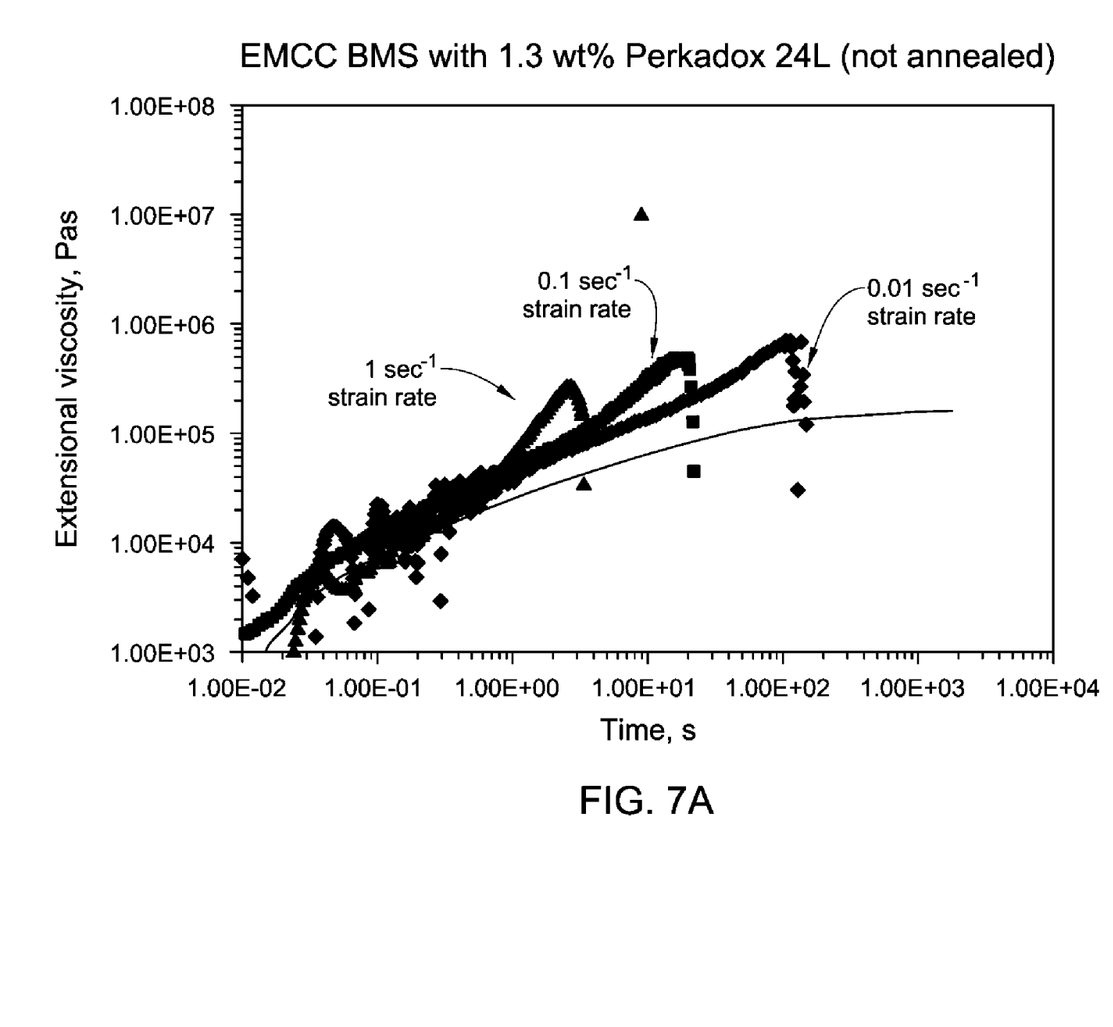
FIG. 7A is a graphical representation of the extensional viscosity (Pa·s, non-annealed) as a function of time (sec) for an exemplary hyperbranched polypropylene (with 1.3 wt % Perkadox™ 24L treated) at the same shear rates as in FIG. 6.
Figure 7B:
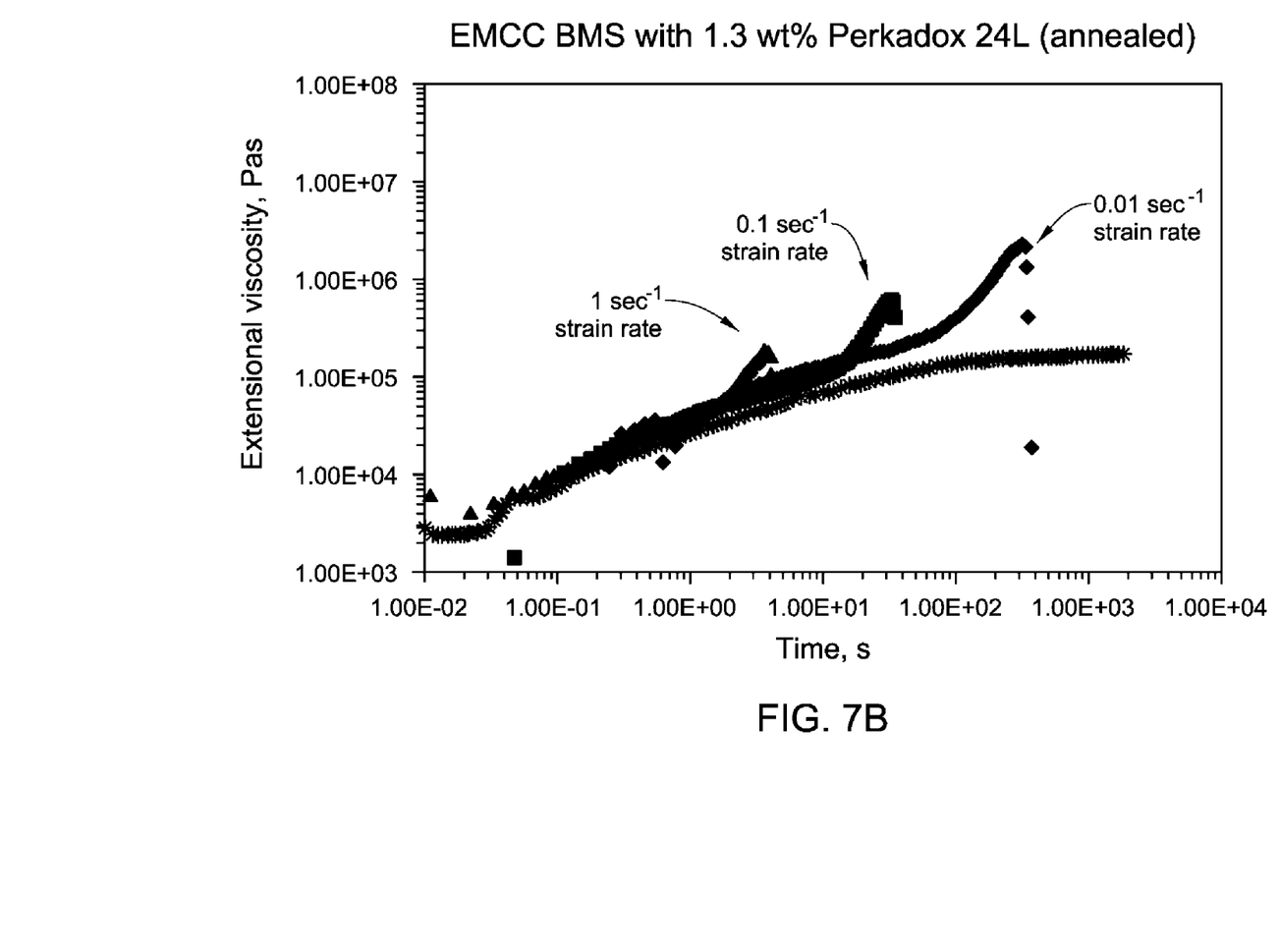
FIG. 7B is the same, but annealed samples.
Figure 8:
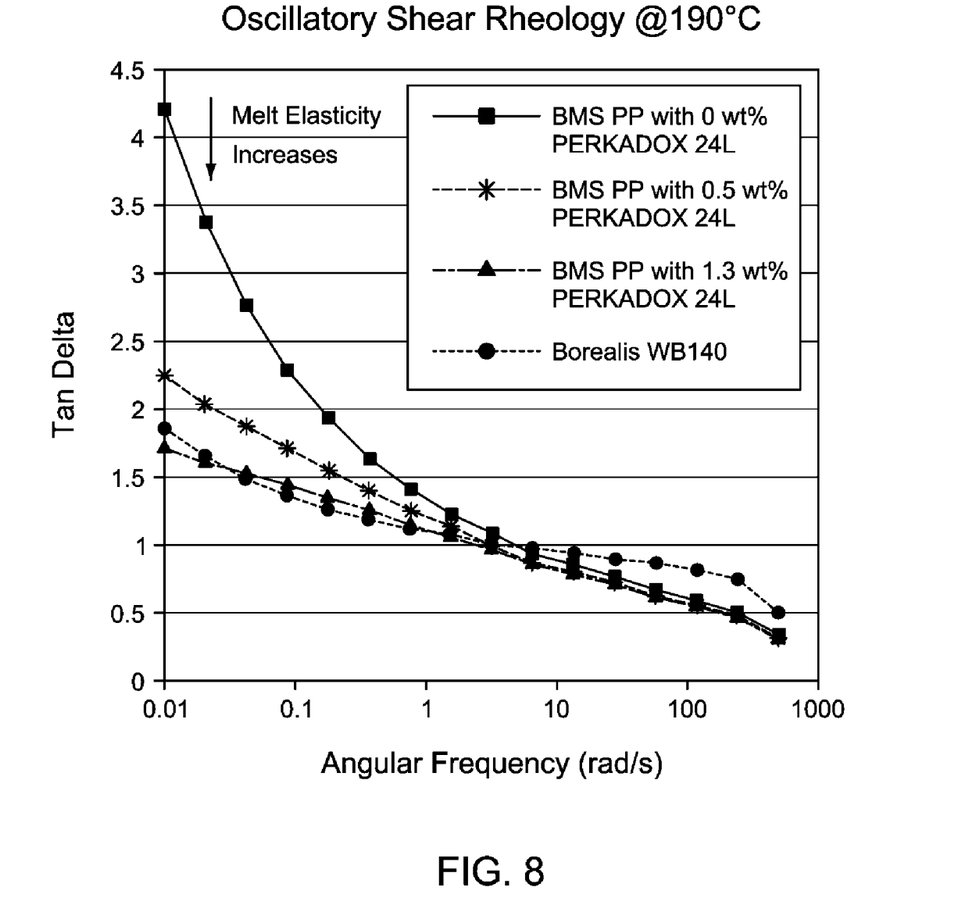
FIG. 8 is a graphical representation of the Tangent Delta as a function of Angular Frequency of the Oscillatory Shear Rheological measurements of comparative and hyperbranched polypropylenes (190° C.).

The hyperbranched polypropylene has improved strain hardening as evidenced in the increased Peak Extensional Viscosity, as shown in FIG. 7A (non-annealed) and FIG. 7B (annealed). In any embodiment the hyperbranched polypropylene has a Peak Extensional Viscosity (non-annealed) of greater than 50, or 55, or 60 kPa·s, or within a range from 50, or 55, or 60, or 65 kPa·s to 500, or 550, or 600 kPa·s at a strain rate of 0.01/sec (190° C.). In any embodiment the hyperbranched polypropylene has a Peak Extensional Viscosity (annealed) of greater than 500, or 550, or 600 kPa·s, or within a range from 500, or 550, or 600, or 605 kPa·s to 2,000, or 2,500, or 3,000 kPa·s at a strain rate of 0.01/sec (190° C.)

Balanced Melt Strength Polypropylene

As stated above, the hyperbranched polypropylenes are derived from a polypropylene having certain desirable features, referred to herein simply as a "balanced melt strength polypropylene" (or BMS PP) as described here, made according to the disclosure in WO 2014/070386. In particular, the balanced melt strength polypropylene is preferably produced in a solution or slurry process, most preferably in two or more reactors in series wherein the level of chain-termination agent, such as hydrogen, is the same or within 2, or 5, or 10% of the value from the first to second, third, (each subsequent) etc. reactor, and/or stated another way, wherein the MFR (ASTM D1238, 230° C./2.16 kg) of the polypropylene from the first reactor is the same or within 2, or 5, or 10% of the value of the polypropylene from in the second, third, (each subsequent) etc. reactor.

In any embodiment the polypropylene useful in the present disclosure comprises at least 50, or 60, or 70, or 80, or 90 mol % propylene-derived units (or "propylene"), or within a range from 50, or 60, or 80 to 95, or 99 or 100 mol % propylene, the remainder being units derived from a comonomer selected from ethylene and $C_4$ to $C_6$, or $C_{10}$, or $C_{12}$, or $C_{20}$ olefins. More preferably, the polypropylene may comprise within the range from 0.1 to 10 mol % of a comonomer selected from the group consisting of ethylene and $C_4$ to $C_6$, or $C_{10}$, or $C_{12}$, or $C_{20}$ olefins, the remainder being propylene. Most preferably the polypropylene is a homopolymer of propylene-derived units.

In any embodiment the polypropylene has an isopentad percentage of greater than 90, or 92, or 95%. Also in any embodiment the polypropylene has a melt flow rate (MFR) within the range from 0.1 to 100 g/10 min, determined according to ASTM D1238 Condition L (230° C./2.16 kg).

In any embodiment the polypropylene has a molecular weight distribution (Mw/Mn) greater than 6, or 8, or 10, or within a range from 6, or 7, or 8 to 14, or 16, or 18 or 20. Also in any embodiment the polypropylene has an Mz/Mw value of less than 3.6, or 3.4, or 3.2, but also in any embodiment greater than or equal to 2.8, or 3.0, or 3.2, most preferably within a range from 2.8 to 3.6. The polypropylene useful herein tends to be highly linear as evidenced by a high branching index. Thus, in any embodiment the polypropylene has a branching index ($g'_{vis}$) of at least 0.97, or 0.98. In any embodiment the polypropylene useful herein has a melt strength greater than 10, or 15, or 20, or 30 cN determined using an extensional rheometer at 190° C., or within a range from 10, or 15, or 20 cN to 35, or 40 cN.

In any embodiment the polypropylene has a viscosity ratio within the range from 35 to 80 determined from the complex viscosity ratio at 0.01 to 100 rad/s angular frequency at a fixed strain of 10% at 190° C. Also in any embodiment the polypropylene has a Peak Extensional Viscosity (non-annealed) within a range from 10, or 20 kPa·s to 40, or 50, or 55, or 60 kPa·s at a strain rate of 0.01/sec (190° C.).

In any embodiment the polypropylene has a heat distortion temperature of greater than or equal to 100° C., determined according to ASTM D648 using a load of 0.45 MPa (66 psi). Finally, in any embodiment the polypropylene has a Modulus within the range from 1800, or 2000 MPa to 2400, or 2500 MPa determined according to ASTM D790A on nucleated samples with 0.1% α-nucleating agent.

Method of Forming Hyperbranched Polypropylenes

The hyperbranched polypropylene, as stated above, is formed by combining under suitable conditions the polypropylene resin and an organic peroxide, wherein the "organic peroxide" is any organic compound comprising at least one —(O)COO— group and/or at least one —O—O— group, and a 1 hour half-life temperature ($^1T_{1/2}$) of less than 100° C. determined in an aromatic and/or halogenated aromatic hydrocarbon solvent, preferably a ($^1T_{1/2}$) within the range from 25, or 35, or 45° C. to 65, or 75, or 85, or 100° C.

In any embodiment, the organic peroxide is selected from compounds having one or more structures selected from:

wherein each "R" group is independently selected from the group consisting of hydrogen, C1 to C24 linear alkyls, C1 to C24 secondary alkyls, C1 to C24 tertiary alkyls, C7 to C30 alkylaryls, C7 to C30 arylalkyls, and substituted versions thereof. By "substituted" what is meant are hydrocarbon "R" groups having substituents such as halogens, carboxylates, hydroxy, amines, mercaptans, and phosphorous containing groups. In a particular embodiment, each "R" group is independently selected from C8 to C20 linear, secondary, or tertiary alkyls.

In any case, it is also preferable if the organic peroxide is blended with the balanced melt strength polypropylene, or "combined", such that it evenly coats the balanced melt strength polypropylene to effect the cross-linking reaction. In any embodiment, reactor granules of the balanced melt strength polypropylene used herein are preferred over extruded pellets. Such balanced melt strength polypropylene granules, flakes or pellets are preferably dry blended with the organic peroxide before "combining" in a reactive extrusion process as described below. This can take place in any type of dry blending apparatus that can blend the ingredients, and preferably mix and/or stir them to enhance contact between the ingredients prior to combining in a reactive extrusion process. In any embodiment the balanced melt strength polypropylene, in whatever form, may be heated up to below its melting point temperature prior to or concurrently with dry blending with the organic peroxide, for instance, to a temperature within a range from 60, or 70, or 80, or 100, or 110, or 120° C. up to the melting point temperature, such as 150, or 155, or 160° C. In any embodiment, the organic peroxide and BMS PP are combined at such an elevated temperature for 10 sec, or 30, sec, or 1 min up to 5 min, or 10 min, or 30 min prior to melt extrusion as described below.

The formation of the hyperbranched polypropylenes described herein are effected in any embodiment by "combining" the ingredients in a reactive extrusion process, for example such as a melt blending or melt extrusion process where shear forces and applied radiative heating are present to cause intimate mixing of the ingredients and effecting the desired chemical reaction. In any embodiment the ingredients are combined to a melt temperature of at least the melting point of the balanced melt strength polypropylene, such as at least 140, or 150, or 160, or 180° C., or within a range from 150, or 160° C. to 180, or 200, or 220, or 240, or 260, or 280, or 300° C. In any embodiment the hyperbranched polypropylene, directly from the extrusion process, is formed into granules or pellets without being treated under vacuum and/or solvent washing.

Thus formed, the hyperbranched polypropylene described herein is ready to ship, transport, and/or store without further treatment, and be used in making any number of articles, both foamed and non-foamed. In any embodiment a foaming agent may be added during the heating/extrusion process described above such that the agent is not activated until after shipping and ready to form into a foamed article. A "foaming" or "blowing" agent is a substance which is capable of producing a cellular structure via a foaming process in a variety of materials that undergo hardening or phase transition, such as polymers and plastics. Common foaming agents include sodium bicarbonate, carbon dioxide, and azobisformamide but there are many others well known in the art. Such agents may be present to any desirable level, in any embodiment from 10, or 20, or 100 ppm to 1000, or 2000 ppm, up to 2, or 3 wt % or more as is known in the art for foaming agents.

In any embodiment a step of exposing the hyperbranched polypropylene to external radiation (e.g., microwaves, gamma rays) is absent at all stages of manufacturing. The term "external radiation" refers to man-made sources of radiation and excludes natural background radiation and/or sunlight. Further, in any embodiment the hyperbranched polypropylene is not heated after the initial heating/extrusion to form the hyperbranched polypropylene. As mentioned, the composition may be later heated/extruded again to form articles and effect foaming, if so desired.

Also, in any embodiment so called "dienes" such as C3 to C20 α-olefins, olefins, diolefins, and conjugated dienes, such as, for example, butadiene, are substantially absent from the balanced melt strength polypropylene and/or the stabilized polypropylene compositions described herein, meaning that if the comonomers are present at all, they are present to a level of less than 1 wt %, 0.1 wt %, or 0.01 wt % of the resin or composition; and preferably dienes are not used (thus absent) in the manufacture of the polypropylene, nor added in any form prior to its use in an article of manufacture, such as a foamed article.

Finally, in any embodiment "cross-linking agents" are absent from the hyperbranched polypropylenes and not added during the process of making them, and most preferably absent from compositions including the hyperbranched polypropylenes and not added during the process of making them. So called "cross-linking agents" are agents that effect chemical bonding between or within polymer chains through two or more active moieties on the agent, each of which can react with a distinct section of the same polymer chain and/or two different polymer chains. Such agents include diene compounds as described above such as butadiene, polybutadiene, alpha-omega dienes such as 1,9-decadiene, and also compounds such as alkyl-cyanurates and alkyl isocyanurates, especially tri(alkyl allyl) cyanurates and tri(alkyl allyl)isocyanurates, glycol dimethacrylates, alkylene-bisacrylamides, imidoesters, hydroxysuccinamides, mercaptans compounds, sulfide compounds, persulfate compounds, azo compounds, and silane compounds, and other combination compounds such as, for example, bis(triethoxysilylpropyl)tetrasulfide.

The compositions may further comprise "additives" within the range from 0.01 wt % to 1, or 2, or 3, or 4 wt %, by weight of the polypropylene, such additives including one or more fillers, antioxidants, anti-cling agents, tackifiers, UV stabilizers, heat stabilizers, anti-blocking agents, release agents, anti-static agents, pigments, colorants, dyes, waxes, silica, talc, or a combination thereof. In a particular embodiment, even when desirable compositions consists of the hyperbranched polypropylene, it may include up to 0.5 wt %, by weight of the composition, of one or more antioxidants, or one or more antioxidants and one or more foaming agents.

In any embodiment if a colorant (dye, pigments, whitening agent, carbon black, etc.) is desired as part of the balanced melt strength polypropylene and/or hyperbranched polypropylene, such colorant may be blended with metallocene-produced flakes or granules of polypropylene homopolymer or copolymer having a peak melting point temperature within a range from 110° C. to 140 or 145 or 150° C. The colorant and granules of this polypropylene are preferably dry blended, alternatively along with other additives such as antioxidants and nucleating agents, and then melt blended such as in an extruder. Most preferably, the useful polypropylene for such a practice will have a melt flow rate (ASTM D1238, 230° C., 2.16 kg) within a range from 1, or 5, or 10 g/10 min to 20 or 30, or 40 g/10 min. The colorant will preferably be present up to 60-90 wt % by weight of the colorant and polypropylene combination, limited by the ability of the polypropylene to hold the colorant and the energy required to compound/extrude. This PP/colorant concentrate or "masterbatch" can then be combined (preferably from 0.1 wt % to 3-5 wt %) with the balanced melt strength polypropylene and organic peroxide, or the resultant composition, to produce the colored versions of desirable compositions.

In any embodiment the disclosure also includes the reaction product of the foaming agent and hyperbranched polypropylene. This reaction product may be formed into any number of suitable foamed articles such as cups, plates, other food containing items, and food storage boxes, toys, handle grips, and other articles of manufacture.

The various descriptive elements and numerical ranges disclosed herein for the hyperbranched polypropylenes and methods of forming such can be combined with other descriptive elements and numerical ranges to describe the hyperbranched polypropylenes and desirable compositions including such; further, for a given element, any upper numerical limit can be combined with any lower numerical limit described herein, including the examples in jurisdictions that allow such combinations. The features of the hyperbranched polypropylenes are demonstrated in the following non-limiting examples.

Examples

The crystallization and melting point temperatures of balanced melt strength polypropylenes and compositions were determined by Differential Scanning calorimetry at 10° C./min on a Pyris™ 1 DSC. The DSC ramp rate is 10° C./min for both heating and cooling. The measurements are taken as follows: 1) Hold for 10.0 min at −20.0° C.; 2) Heat from −20.0° C. to 200.0° C. at 10.0° C./min; 3) Hold for 10.0 min at 200.0° C.; 4) Cool from 200.0° C. to −20.0° C. at 10.0° C./min; 5) Hold for 10.0 min at −20.0° C.; and 6) Heat from −20.0° C. to 200.0° C. at 10.0° C./min.

The high load melt index ($I_{21}$ or HLMI) parameters were determined per ASTM D1238, at 190° C., 21.6 kg; the melt index at 190° C., 2.16 kg. The Melt Flow Rates (MFR) were determined under Condition L, at 230° C., 2.16 kg.

Polymer molecular weight (weight-average molecular weight, Mw, number-average molecular weight, Mn, and z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS), and also a Multi-Angle Light Scattering detector (MALLS), where mono-dispersed polystyrene is the standard in all cases. The Mark-Houwink constants used were K=0.000229, and a=0.705. Three Polymer Laboratories PLgel 10 mm Mixed-B columns are used. The nominal flow rate is 0.5 cm$^3$/min and the nominal injection volume is 300 µL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 µm glass pre-filter and subsequently through a 0.1 µm Teflon filter. The TCB is then degassed with an online degasser before entering the SEC. MALLS analysis is relied upon for Mw and Mz when calculating, for example, Mw/Mn, or Mz/Mn for the hyperbranched polypropylene, which is a more accurate method for measuring highly branched polymers, while DRI values are used for Mn, which is more sensitive and detects smaller molecules. For purposes of the claims and specification, SEC-DRI shall be used unless otherwise specified.

The branching index ($g'_{vis}$, also referred to as $g'_{vis\ avg}$) is calculated using the output of the SEC-DRI-LS-VIS method (described in U.S. Pat. No. 7,807,769), and as described in WO 2014/070386.

Shear Thinning and Strain Hardening

A MCR501 Dynamic Stress/Strain Rheometer was used to measure shear thinning of the polypropylene samples. A TA Instruments ARES-G2 mechanical spectrometer was used to measure strain hardening of the polypropylene samples.

Sample Preparation:

It was observed that some of the melted samples could collapse before testing. So we had two ways to prepare the samples:

Not Annealed Method:

A sample was heated to around 200° C. for 3 min to melt the PP pellets without pressure. Then 1500 psi pressure was applied while the sample was kept heated for another 3 min between two plates. Afterwards, still under the 1500 psi pressure, the sample was cooled down with water circulation for 3 min.

Annealed Method:

A sample was heated to around 200° C. for 3 min to melt the PP pellets without pressure. Then 1500 psi pressure was applied while the sample was kept heated for another 3 min between two plates. Afterwards, the pressure applied to sample was removed while the sample was kept heated at 200° C. for another 20 min. After 20 min, the sample was cooled down with water circulation without any pressure applied for additional 20 min.

Testing Temperature:

The temperature can vary from 120° C. to 190° C. for extensional and we set 190° C. for PP testing. As for the Hencky strain rate in extensional, it was run at 0.01 s$^{-1}$, 0.1 s$^{-1}$ and 1.0 s$^{-1}$.

Melt Strength and Elongational Viscosity

The method used to measure the melt strength and elongational viscosity using the Rheotester 1000 capillary rheometer in combination with the Rheotens 71.97 (Göttfert) is described in established test method RHE04-3.3 ("Measurement of the elongational viscosity of molten polymers").

A. Test Conditions:

The conditions for testing melt strength/extensional viscosity using the Rheotens 71-97 in combination with the Rheotester 1000 are described in RHEO4-3.3:

1. Rheotester 1000:
   Temperature: 190° C.
   Die: 30/2
   Piston speed: 0.278 mm/s
   Shear rate: 40.050 sec$^{-1}$
2. Strand:
   Length: 100 mm
   Vo: 10 mm/s
3. Rheotens:
   Gap: 0.7 mm
   Wheels: grooved
   Acceleration: 12.0 mm/s$^2$ B. Testing:

For each material, several measurements are performed. In fact, the complete amount of material present in the barrel of the Rheotester was extruded through the die and was being picked up by the rolls of the Rheotens. Once the strand is placed between the rolls, the roll speed was adjusted until a force of "zero" was measured. This beginning speed "Vs" was the speed of the strand through the nip of the wheels at the start of the test.

Once the test was started, the speed of the rolls was increased with a 12.0 mm/s$^2$ acceleration and the force was measured for each given speed. After each strand break, or strand slip between the rotors, the measurement was stopped and the material was placed back between the rolls for a new measurement. A new curve was recorded. Measuring continued until all material in the barrel was used.

C. Data Treatment:

After testing, all the obtained curves are saved. Curves, which are out of line, are deactivated. The remaining curves, are cut at the same point at break or slip (maximum force measured), and are used for the calculation of a mean curve. The numerical data of this calculated mean curves are reported.

Inventive Composition and Method of Making

The Perkadox 24L™ (Akzo-Nobel) was dry-tumble blended with all other additives as well as the balanced melt strength polypropylene granules at 25° C. Then the mixture was sent to a ZSK 30 mm twin screw extruder with underwater strand cut at temperature from 230-240° C. The balanced melt strength polypropylene was made using a magnesium chloride supported titanium catalyst sold commercially as Avant™ ZN168 (LyondellBasell) with an external donor blend of propyltriethoxysilane and dicyclopentyldimethoxysilane as in U.S. Pat. Nos. 6,087,459 and 6,686,433. The balanced melt strength polypropylene having a MFR of 2.3 g/10 min used in these experiments has a number average molecular weight (Mn) of about 33,000 g/mole, and an Mw of about 370,000 g/mole, and an Mz of about 1,100,000 g/mole, a Mw/Mn of 11.2, and an Mz/Mw of 3.0. The branching (g'$_{vis}$) value for the balanced melt strength polypropylene used here was 0.99.

TABLE 1

Results of Testing (ASTM D1238 190° C., 2.16 or 21.6 kg)

| Addition to BMS-PP (wt % addition) | Extrusion T (° C.) | I$_2$ | I$_{21}$ | I$_{21}$/I$_2$ |
|---|---|---|---|---|
| Perkadox 24L 0.5 wt % | 240 | 1.89 | 312 | 165 |
| Perkadox 24L 1.3 wt % | 240 | 1.11 | 200 | 180 |
| Enable ™ 3505 4 wt % | 240 | 2.24 | 322 | 143 |
| BMS PP Control | 240 | 2.36 | 334 | 142 |

From the results, it is apparent that by adding the organic peroxide to the polypropylene that I$_2$ increases, which is indicative of either cross-linking of the polymer chains, formation of long chain branches on the polymer chains, or a combination of both. Also, it is noted that the I$_{21}$/I$_2$ (MIR) goes up with addition of organic peroxide. This could be indicative of improved shear thinning due to formation of long chain branches on the balanced melt strength polypropylene. Note that adding Enable™ 3505 polypropylene, a long chain branched polypropylene, did not improve shear thinning (relative to the 2.3 MFR "Control", untreated balanced melt strength polypropylene) as indicated in the MIR.

TABLE 2

Results of Extensional Viscosity Testing

| Amount of Perkadox (wt %) | Temperature (C.) | Relative Peak Extensional Viscosity at 0.01 sec-1 (kPa · s) |
|---|---|---|
| 0 | 240 | 52 (not annealed) |
| 1.3 | 240 | 1,798 (annealed) |
|  |  | 458 (not annealed) |
| 0.5 | 240 | 393 (not annealed) |

Figure 1:
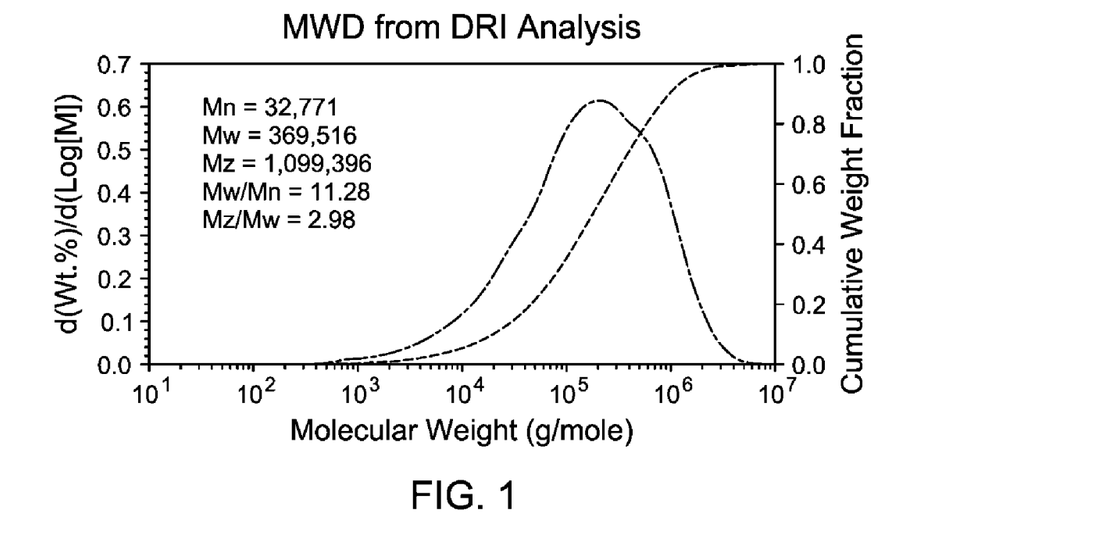
FIG. 1 is a graphical representation of Gel Permeation Chromatography using a Differential Refractometer [GPC (DRI)] traces for an exemplary balanced melt strength polypropylene useful herein.
Figure 2:
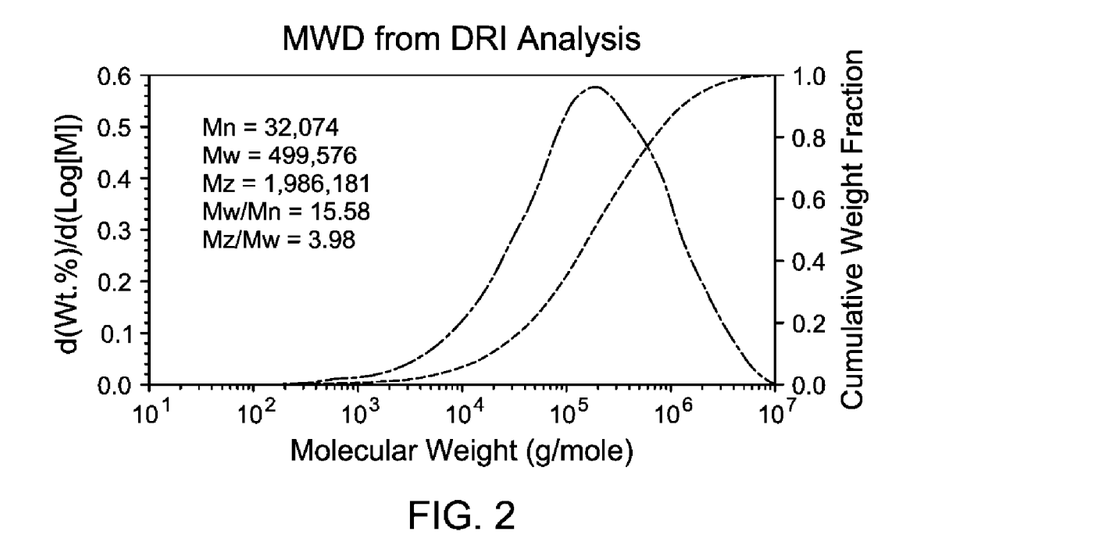
FIG. 2 is a graphical representation of GPC (DRI) traces for an exemplary hyperbranched polypropylene.
Figure 3:
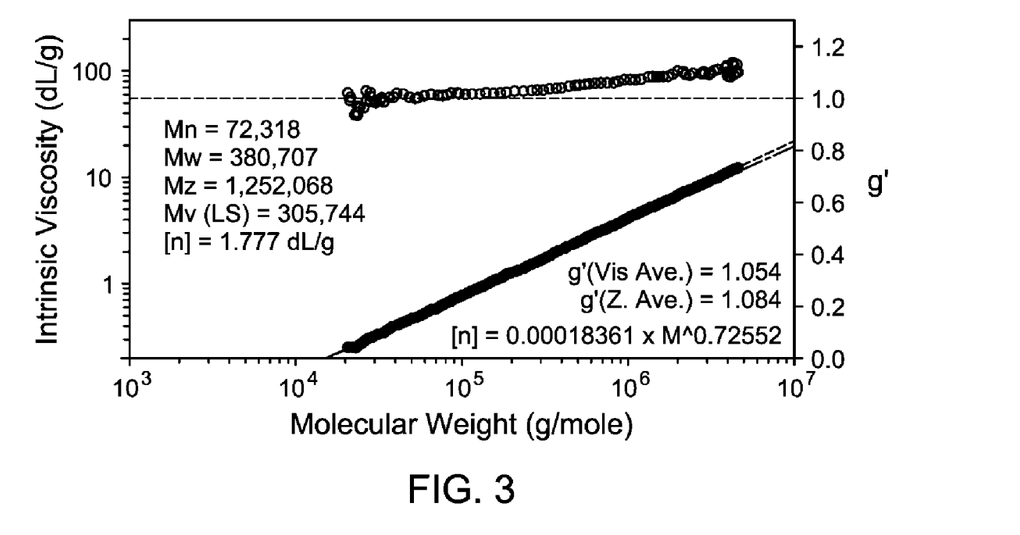
FIG. 3 is a graphical representation of Multi Angle Light Scattering (MALLS) 3D-GPC (DRI) intrinsic viscosity traces for an exemplary balanced melt strength polypropylene used in the compositions.
Figure 4:
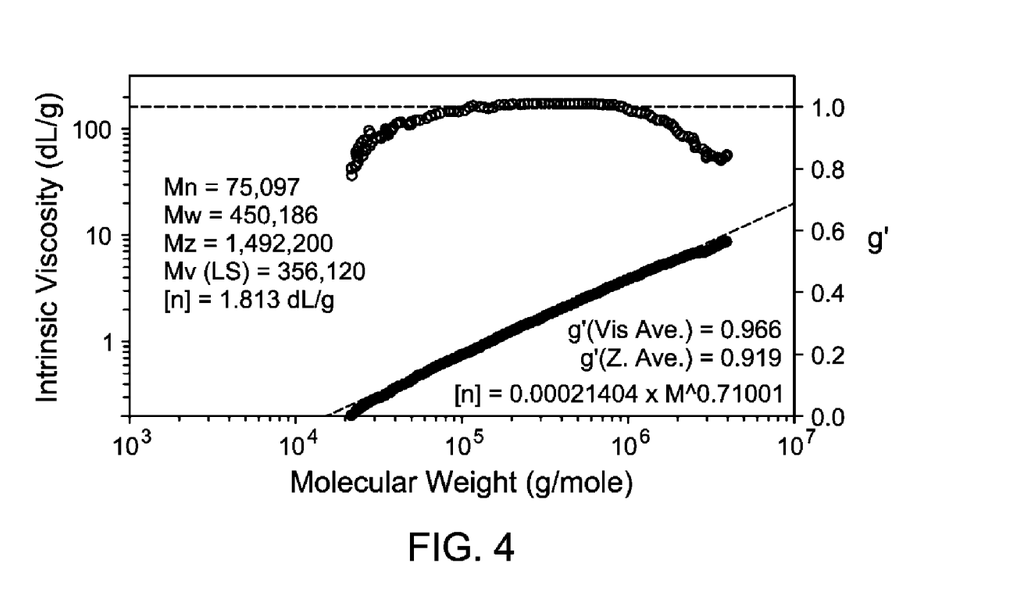
FIG. 4 is a graphical representation of MALLS 3D-GPC (DRI) intrinsic viscosity traces for an exemplary hyperbranched polypropylene.
Figure 5:
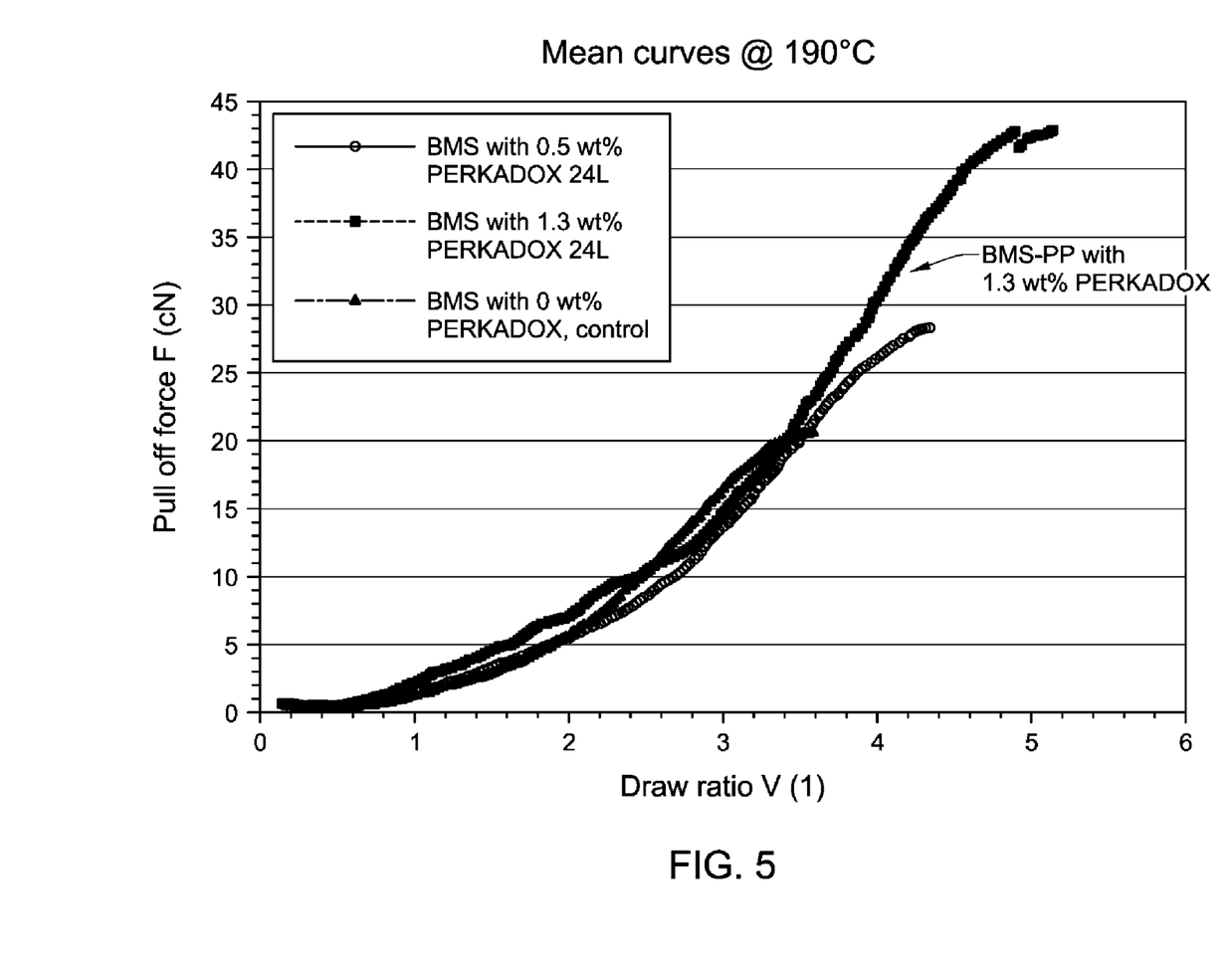
FIG. 5 is a graphical representation of the Gotffert Rheotens pull-off force (cN) as a function of the draw ratio for an exemplary balanced melt strength polypropylene (without Perkadox™ 24L) and exemplary composition (with 0.5% and 1.3% Perkadox™ 24L treatment).
Figure 6:
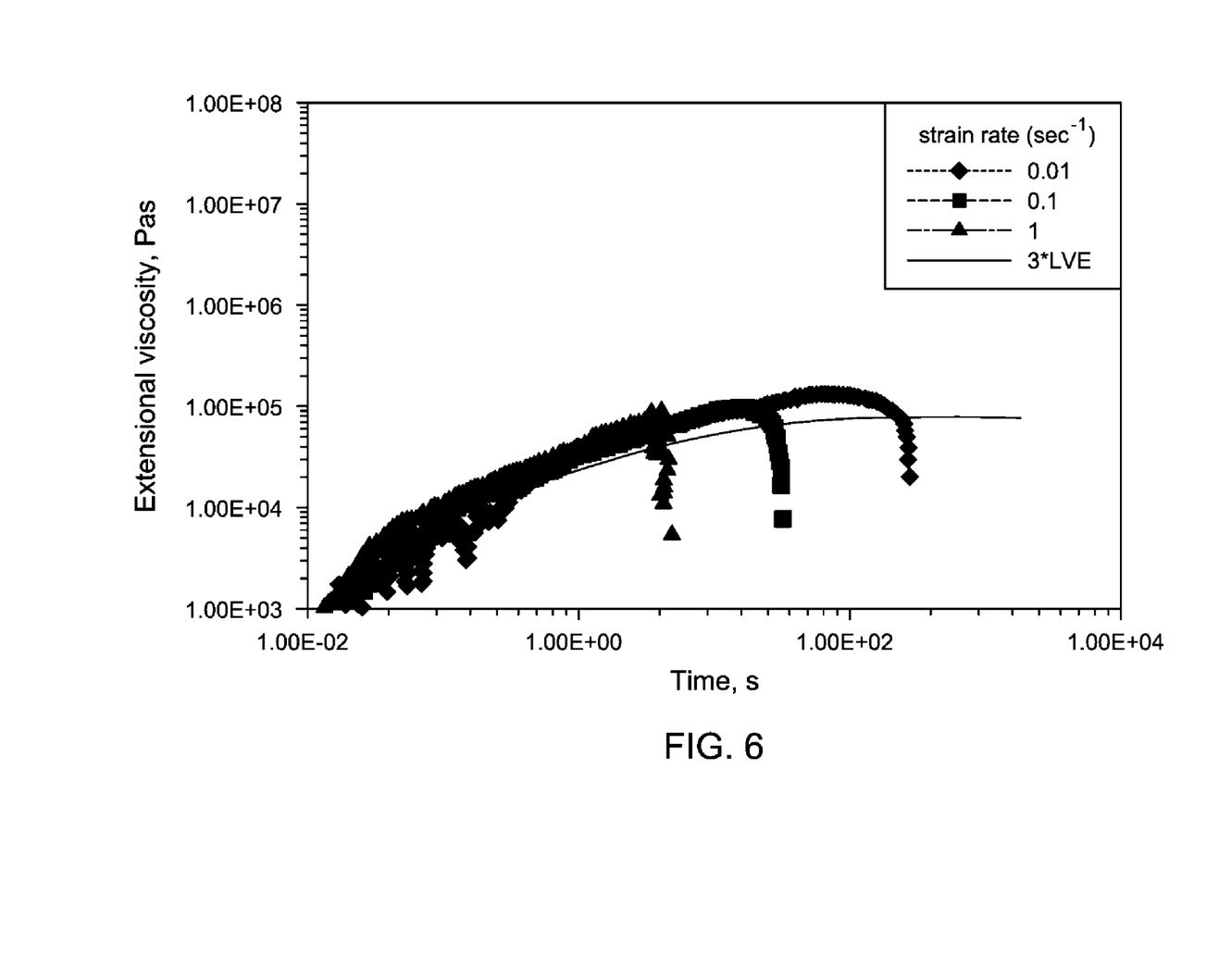
FIG. 6 is a graphical representation of the extensional viscosity (Pa·s) as a function of time (sec) for an exemplary balanced melt strength polypropylene (2 MFR) used in the compositions disclosed herein at three shear rates at 240° C. (the "LYE" line is the linear viscoelastic limit).

The Table 2 above demonstrates that strain hardening, also referred to as extensional thickening, is an increase in the extensional viscosity above the linear viscoelastic curve. The peak extensional viscosity, relative to the LVE, were compared in Table 2, or "Relative Peak Extensional Viscosity." The data is derived from plots such as shown in FIGS. 6 and 7 for the polypropylene with 1.3% Perkadox 24L when compared to the polypropylene Control without addition of Perkadox 24L. Melt strength measurements were carried out using a Gotffert Rheotens melt strength tester. The maximum pull off force at which the polymer melt breaks is called the "melt strength" shown in FIG. 5. The "melt strength" for the hyperbranched polypropylene (30 cN for 0.5 wt % organic peroxide, and 43 cN for 1.3 wt % organic peroxide) is significantly higher than for the control polypropylene not modified with Perkadox 24L (20 cN).

Comparative Experiments

Two comparative polypropylene homopolymers having relatively narrow molecular weight distributions (Mw/Mn less than 6.0) and no appreciable high molecular weight tail (e.g., an Mz/Mw of less than 2.8) were treated with the organic peroxide Perkadox 24L as described above to compare their behavior to the same treatment of the BMS PP.

The results of this are presented in Table 3. In particular, the comparative "narrow MWD" polypropylenes are both homopolymers:

"A" polypropylene, having an MFR of 5.0 g/10 min, an Mn of 77,104 g/mole, and Mw of 312,697 g/mole, and Mz of 768,888 g/mole, and Mw/Mn of 4.06, and an Mz/Mw of 2.46; and "B" polypropylene having an MFR of 2 g/10 min, an Mn of 63,119 g/mole, an Mw of 332,390 g/mole, an Mz of 893,884 g/mole an Mw/Mn of 5.3, and an Mz/Mw of 2.7;

all determined by GPC DRI. The two polypropylenes are 5 MFR (having and MFR of 5 g/10 min) and 2 MFR (having an MFR of 2 g/10 min). The organic peroxide used to treat the "B" and 2 MFR BMS in the form of a powder (less than 3 mm diameter or length), whereas the organic peroxide used to treat the "A" and the 5 MFR BMS was in the form of 3-5 mm (length) flakes. The blending took place as described above. As can be seen, the effect of the organic peroxide on the narrow MWD polypropylenes is not as pronounced as with the BMS PPs.

TABLE 3

Comparative Examples

| Sample | wt % organic peroxide | MFR (g/10 min) | Melt Strength (cN) |
|---|---|---|---|
| 5 MFR BMS PP | 0.0 | 5.0 | 13.9 |
| 5 MFR BMS PP | 0.8 (flake) | 2.64 | 25.5 |
| 5 MFR BMS PP | 1.5 (flake) | 1.73 | 42.4 |
| 2 MFR BMS PP | 0.0 | 2.0 | 12 |
| 2 MFR BMS PP | 0.75 (powder) | 0.7 | 60 |
| narrow MWD polypropylenes | | | |
| A | 0.0 | 5.23 | 3.5 |
| A | 0.4 (flake) | 5.70 | 4.6 |
| A | 0.8 (flake) | 4.51 | 10.3 |
| A | 1.2 (flake) | 4.67 | 13.0 |
| A | 1.5 (flake) | 3.10 | 20.0 |
| B | 0.0 | 2.8 | 4 |
| B | 1.0 (powder) | 2.5 | 11 |
| B | 2.0 (powder) | 2.2 | 12 |

Effect of Mixing Temperature and MFR of Base Polypropylene

Experiments were conducted to determine the impact of heated mixing of the Perkadox 24L with the base PP through looking at the strain hardening, shear thinning and melt strength on the products made with heated mixing process. The following procedure was used for two different MFR BMS PP's:

Preheat ovens to 75° C.

Place 10 lbs each of BMS PP's in plastic bags.

Place 5 bags of 4 MFR and 5 bags of 2.1 MFR into oven and heat overnight; 2 samples of each MFR PP's kept at room temperature overnight (25° C.).

Weight additives (antioxidants, organic peroxide, etc.) for each formulation and put them into whir packs to be used for mixing in a bucket.

Blending:

When ready for compounding, pour hot granules into bucket

Add the prepared additive in whir packs into the bucket

Seal the bucket and shake it well

Wait for the specified time (4, 5 or 10 min) Table 4

Run mixed material on 30 mm extruder, then record melt flow and melt strength properties.

Further, two types of heated mixing was tested:

Single-Step: Add Perkadox 24L together with all other additives in one step and mix all of them directly with heated granule BMS PP; and Two-Step: Add Perkadox 24L first to the heated granule and mix them together in the $1^{st}$ step; then add all other additives at the $2^{nd}$ step to the mixture of hot BMS PP and Perkadox 24L. Then mix all compositions again.

The results show that, in general, lower MFR polypropylene has a higher melt strength and strain hardening (curves not shown), and shear thinning (as evidenced by $I_{21}/I_2$), and heating the granules with the organic peroxide slightly increased these properties, as shown in Table 4.

TABLE 4

Effect of Mixing Temperature and MFR

| Perkadox 24L (wt %) | Base granule hPP MFR (g/10 min) | Blending base resin Temp (° C.) | Residence time with Perkadox (min) | Single- or Two-step additive adding | $I_2$ (g/10 min) | $I_{21}$ (g/10 min) | $I_{21}/I_2$ (MIR) | Melt Strength |
|---|---|---|---|---|---|---|---|---|
| 0.5 | 4.0 | 25 | 5 | Single | 2.2 | 309.7 | 139.5 | 25 |
| 0.2 | 4.0 | 25 | 5 | Single | 2.8 | 380.2 | 133.9 | 10 |
| 0.5 | 2.1 | 75 | 5 | Single | 0.7 | 126.9 | 184.0 | 55 |
| 0.2 | 2.1 | 75 | 5 | Single | 1.1 | 185.6 | 167.2 | 34 |
| 0.5 | 4.0 | 75 | 5 | Single | 2.2 | 295.3 | 134.2 | 30 |
| 0.2 | 4.0 | 75 | 5 | Single | 2.7 | 357.9 | 132.1 | 12 |
| 0.5 | 2.1 | 25 | 5 | Single | 0.9 | 169.3 | 184.1 | 35 |
| 0.2 | 2.1 | 25 | 5 | Single | 1.0 | 198.6 | 196.6 | 33 |
| 0.5 | 2.1 | 75 | 10 | Single | 0.9 | 145.9 | 162.1 | 45 |
| 0.2 | 2.1 | 75 | 10 | Single | 0.9 | 177.8 | 193.3 | 36 |
| 0.5 | 4.0 | 75 | 10 | Single | 2.0 | 300.8 | 148.2 | 30 |
| 0.2 | 4.0 | 75 | 10 | Single | 2.8 | 387.0 | 137.7 | 10 |
| 0.2 | 4.0 | 75 | 4 | Two-step | 2.7 | 378.6 | 141.8 | 12 |
| 0.2 | 2.1 | 75 | 4 | Two-step | 1.0 | 182.3 | 186.0 | 36 |

Having described the various aspects of the hyperbranched polypropylenes, and articles made therefrom, described here in numbered paragraphs is:

P1. A composition comprising (or consisting essentially of, or consisting of) the reaction product of:
- a polypropylene comprising at least 50 mol % propylene, and having a molecular weight distribution (Mw/Mn) greater than 6, a branching index ($g'_{vis}$) of at least 0.97, and a melt strength greater than 10 cN determined using an extensional rheometer at 190° C.; and
- within the range from 0.01 to 3 wt % of at least one organic peroxide, by weight of the polypropylene and organic peroxide.

P2. A composition having a melt strength within the range from 40 cN to 100 cN, and a branching index ($g'_{vis}$) of less than 0.97.

P3. The composition of numbered paragraphs 1 or 2, comprising cross-linked polypropylene, long-chain branched polypropylene, or a combination thereof; and preferably comprising decomposition products comprising (or consisting of) carbon dioxide and alcohol.

P4. A process to form a composition comprising (or consisting of, or consisting essentially of) combining:
- a polypropylene comprising at least 50 mol % propylene, and having a molecular weight distribution (Mw/Mn) greater than 6, a branching index ($g'_{vis}$) of at least 0.97, and a melt strength greater than 10 cN determined using an extensional rheometer at 190° C.; and
- within the range from 0.01 to 3 wt % of at least one organic peroxide, by weight of the polypropylene and organic peroxide.

P5. The composition or process of any one of the previous numbered paragraphs, wherein the polypropylene has an MWD (Mw/Mn) within the range from 6 to 18.

P6. The composition or process of any one of the previous numbered paragraphs, wherein the polypropylene has a melt strength within the range from 10 cN to 40 cN.

P7. The composition or process of any one of the previous numbered paragraphs, wherein the polypropylene has a Peak Extensional Viscosity (non-annealed) within a range from 10 kPa·s to 60 kPa·s at a strain rate of 0.01/sec (190° C.).

P8. The composition or process of any one of the previous numbered paragraphs, wherein the polypropylene has a heat distortion temperature of greater than or equal to 100° C., determined according to ASTM D648 using a load of 0.45 MPa (66 psi).

P9. The composition or process of any one of the previous numbered paragraphs, wherein the polypropylene comprises at least 90 mol % propylene.

P10. The composition or process of any one of the previous numbered paragraphs, wherein the polypropylene has a melt flow rate (MFR) within the range from 0.1 to 100 g/10 min, determined according to ASTM D1238 Condition L (230° C./2.16 kg).

P11. The composition or process of any one of the previous numbered paragraphs, wherein the polypropylene has an Mz/Mw value of less than 3.6.

P12. The composition or process of any one of the previous numbered paragraphs, wherein the polypropylene has a Modulus within the range from 1800, or 2000 MPa to 2400, or 2500 MPa determined according to ASTM D790A on nucleated samples with 0.1% α-nucleating agent.

P13. The composition or process of any one of the previous numbered paragraphs, wherein the organic peroxide is selected from compounds having structure(s) selected from:

wherein each "R" group is independently selected from the group consisting of hydrogen, C1 to C24 linear alkyls, C1 to C24 secondary alkyls, C1 to C24 tertiary alkyls, C7 to C30 alkylaryls, C7 to C30 arylalkyls, and substituted versions thereof.

P14. The composition or process of numbered paragraph 13, wherein each "R" group is independently selected from C8 to C20 linear, secondary, or tertiary alkyls.

P15. The composition or process of any one of the previous numbered paragraphs, the composition having an $Mz_{MALLS}/Mw_{MALLS}$ value of greater than 3.0.

P16. The composition or process of any one of the previous numbered paragraphs, the composition having an MWD-$_{MALLS}$ within the range from 10 to 20.

P17. The composition or process of any one of the previous numbered paragraphs, the composition having a branching index ($g'_{vis}$) of less than 0.97.

P18. The composition or process of any one of the previous numbered paragraphs, the composition having a melt strength within the range from 40 cN to 100 cN.

P19. The composition or process of any one of the previous numbered paragraphs, the composition having a Peak Extensional Viscosity (non-annealed) of greater than 50 kPa·s at a strain rate of 0.01/sec (190° C.).

P20. The composition or process of any one of the previous numbered paragraphs, wherein dienes are absent from the composition.

P21. The composition or process of any one of the previous numbered paragraphs, further comprising a foaming agent.

P22. A foamed article comprising the reaction product of the foaming agent and composition of (or made according to) any one of the previous numbered paragraphs.

P23. The foamed article of numbered paragraph 22, the article selected from the group of cups, plates, and food storage boxes.

P24. The composition or process of any one of the previous numbered paragraphs 1 to 20, wherein a step of exposing the composition to external radiation is absent at all stages of manufacturing.

P25. The composition or process of any one of the previous numbered paragraphs 1 to 20, and 24, wherein the composition is free from vacuum and/or solvent treatment.

P26. The composition or process of any one of the previous numbered paragraphs 1 to 20, and 24 to 25, further comprising, prior to combining the components, dry-blending the components, preferably while heating the components to below the melting point temperature of the polypropylene.

P27. The composition or process of any one of the previous numbered paragraphs 1 to 20, and 24 to 26, wherein dienes not added.

P28. The composition or process of any one of the previous numbered paragraphs 1 to 20, and 24 to 27, wherein the polypropylene is produced in a solution or slurry process in two or more reactors in series wherein the level of chain-termination agent is within 10% of the value from the first to each subsequent reactor.

P29. The composition or process of any one of the previous numbered paragraphs 1 to 20, and 24 to 28, wherein cross-linking agents are absent.

Also disclosed herein is the use of the hyperbranched polypropylene in an article, the composition comprising (or consisting essentially of, or consisting of) the reaction product of a polypropylene comprising at least 50 mol % propylene, and having a molecular weight distribution (Mw/Mn) greater than 6, a branching index (g'vis) of at least 0.97, and a melt strength greater than 10 cN determined using an extensional rheometer at 190° C.; and within the range from 0.01 to 3 wt % of at least one organic peroxide, by weight of the polypropylene and organic peroxide.

The phrase "consisting essentially of" in a composition means that no other additives are present in the composition being referred to other than those named, or, if present, are present to a level no greater than 0.5, or 1.0, or 2.0, or 4.0 wt % by weight of the composition; and in a process, "consisting essentially of" means that no other major process step is present that effects the formation of covalent chemical bonds between two or more moieties, for example, exposure to external radiation, addition of reactive cross-linking agents, etc.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A composition comprising the reaction product of:
   a polypropylene comprising at least 50 mol % propylene, and having a molecular weight distribution (Mw/Mn) greater than 6, an Mz/Mw value of greater than or equal to 2.8, a branching index ($g'_{vis}$) of at least 0.97, and a melt strength greater than 10 cN determined using an extensional rheometer at 190° C.; and
   within the range from 0.01 to 3 wt % of at least one organic peroxide, by weight of the polypropylene and organic peroxide.

2. The composition of claim 1 wherein the polypropylene has an MWD (Mw/Mn) within the range from 6 to 18.

3. The composition of claim 1, wherein the polypropylene has a melt strength within the range from 10 cN to 40 cN.

4. The composition of claim 1, wherein the polypropylene has a Peak Extensional Viscosity (non-annealed) within a range from 10 kPa·s to 60 kPa·s at a strain rate of 0.01/sec (190° C.).

5. The composition of claim 1, wherein the polypropylene has a heat distortion temperature of greater than or equal to 100° C., determined according to ASTM D648 using a load of 0.45 MPa (66 psi).

6. The composition of claim 1, wherein the polypropylene comprises at least 90 mol % propylene.

7. The composition of claim 1, wherein the polypropylene has a melt flow rate (MFR) within the range from 0.1 to 100 g/10 min, determined according to ASTM D1238 Condition L (230° C./2.16 kg).

8. The composition of claim 1, wherein the polypropylene has an Mz/Mw value of less than 3.6.

9. The composition of claim 1, the composition having an $Mz_{MALLS}/Mw_{MALLS}$ value of greater than 3.0.

10. The composition of claim 1, the composition having an $MWD_{MALLS}$ within the range from 10 to 20.

11. The composition of claim 1, the composition having a branching index ($g'_{vis}$) of less than 0.97.

12. The composition of claim 1, the composition having a melt strength within the range from 40 cN to 100 cN.

13. The composition of claim 1, the composition having a Peak Extensional Viscosity (non-annealed) of greater than 50 kPa·s at a strain rate of 0.01/sec (190° C.).

14. The composition of claim 1, wherein dienes are absent from the composition.

15. The composition of claim 1, further comprising a foaming agent.

16. A foamed article comprising the reaction product of the foaming agent and composition of claim 15.

17. The foamed article of claim 16, the article selected from of cups, plates, and food storage boxes.

* * * * *